United States Patent [19]

Ueno

[11] Patent Number: 4,489,113

[45] Date of Patent: Dec. 18, 1984

[54] FLUORORUBBER-BASED HEAT-SHRINKABLE TUBES AND COMPOSITION THEREFOR

[75] Inventor: Keiji Ueno, Osaka, Japan

[73] Assignee: Sumitomo Electric Industries, Ltd., Osaka, Japan

[21] Appl. No.: 346,328

[22] Filed: Feb. 5, 1982

[30] Foreign Application Priority Data

Feb. 5, 1981 [JP] Japan .................................. 56-16587
Feb. 5, 1981 [JP] Japan .................................. 56-16588

[51] Int. Cl.³ ...................... B32B 27/30; C08L 27/16
[52] U.S. Cl. ............................. 428/36; 174/DIG. 8; 525/199
[58] Field of Search ........................ 525/199; 428/36; 174/DIG. 8; 264/342 R, 345

[56] References Cited

U.S. PATENT DOCUMENTS

| | | | |
|---|---|---|---|
| Re. 28,688 | 6/1976 | Cook | 260/4 |
| 3,944,689 | 3/1976 | Luckock et al. | 525/199 |
| 4,045,402 | 8/1977 | Bjerk et al. | 525/199 |
| 4,325,998 | 4/1982 | Chapman | 428/36 |
| 4,347,268 | 8/1982 | Close | 525/199 |
| 4,348,312 | 9/1982 | Tung | 525/199 |

*Primary Examiner*—Alexander S. Thomas
*Attorney, Agent, or Firm*—Sughrue, Mion, Zinn, Macpeak and Seas

[57] ABSTRACT

A heat shrinkable tube comprising a mixture of 100 parts by weight of fluororubber and 10 to 100 parts by weight of a crystalline polymer, said mixture being expanded into a tubular form after cross-linking. The tube has high heat resistance and oil resistance and is useful for reconnection of connectors of communication cables and electric cables a for the prevention of corrosion of steel which can be used at high temperatures.

2 Claims, No Drawings

FLUORORUBBER-BASED HEAT-SHRINKABLE TUBES AND COMPOSITION THEREFOR

The present invention relates to heat-shrinkable tubes. More particularly, it is concerned with heat-shrinkable tubes comprising a mixture of rubber and a crystalline polymer, which is expanded into a tubular form after cross-linking.

Heat shrinkable tubes composed mainly of synthetic resins such as polyethylene, an ethylene-vinyl acetate copolymer, polyvinyl chloride and chlorinated polyethylene have heretofore been known. It is also known as descirbed in Japanese Patent Publication No. 39996/1976 that heat-shrinkable tubes are prepared from mixtures of amorphous rubber-like polymers and crystalline polymers.

There has been increasing desire for heat-shrinkable tubes having higher heat resistance, oil resistance and the like characteristics and for those which can be used at higher temperatures.

As a result of extensive investigations it has been found that heat-shrinkable tubes which can be used for reconnection of connectors of communication cables and electric cables or for the prevention of corrosion of steel pipes and which are capable of being used at temperatures higher than 150° C. can be prepared from those compositions containing fluororubber as a major ingredient.

The present invention is based on the above finding and provides a fluororubber-based heat-shrinkable tube comprising a mixture of (1) 100 parts by weight of fluororubber and (2) 10 to 100 parts by weight of an ethylene-vinyl acetate copolymer having a vinyl acetate content of 10 to 30% by weight or an ethylene-ethyl acrylate copolymer having an ethyl acrylate content of 8 to 20% by weight, said mixture being expanded into a tubular form after cross-linking.

Generally, materials having a memory effect (a property that the strain previously formed is removed by heating and the original form is recovered) which are useful for preparing heat-shrinkable tubes can generally be prepared using those polymers containing crystals therein or by mixing crystalline polymers. Examples of such crystalline polymers include polyethylene, polypropylene, an ethylene-vinyl acetate copolymer (hereinafter referred to as "EVA"), an ethylene-ethyl acrylate copolymer (hereinafter referred to as "EEA"), polyvinylidene fluoride and polyamide.

Of the foregoing crystalline polymers, polyethylene and polypropylene have particularly high degrees of crystallization. Furthermore, polyethylene, polypropylene and the like have a solubility parameter (which is one of the criteria for the determination of compatibility and which is hereinafter referred to as "SP") of 7.8 to 8.0, which approaches the SP of 6.2 of fluororubber. It is therefore considered that such crystalline polymers as polyethylene and polypropylene would have good compatibility with the fluororubber and be suitable for mixing therewith to prepare fluororubber-based composition which could be used for the production of heat-shrinkable tubes.

In practice, however, it has been found that when such crystalline polymers are mixed with fluororubber by the use of heat rolls, they do not intermingle at all with each other and separate completely from each other, and molding thereof becomes impossible.

On the other hand, it has been found that when EVA having an SP value of 8.3 to 9.4 and EEA having an SP value of 8.5 to 9.4, which values are considerably higher than that of fluororubber, are used as a crystalline polymer and mixed by the use of heat rolls, the compatibility thereof with fluororubber is better as the vinyl acetate or ethyl acrylate content is higher, i.e., as the SP value is greater.

Furthermore, it has been experimentally confirmed that the vinyl acetate content of EVA and the ethyl acrylate content of EEA should be at least 10% by weight and at least 8% by weight, respectively. However, when they exceed 30% by weight and 20% by weight, respectively, the crystallizability of EVA and EEA is lost and these copolymers become rubber-like, and therefore, even if such EVA or EEA is mixed with fluororubber, the memory effect cannot be obtained.

Therefore, the vinyl acetate content of EVA and the ethyl acrylate content of EEA which can be used are from 10 to 30% by weight and from 8 to 20% by weight, respectively.

The amount of EVA or EEA to be added to fluororubber is approximately 10 to 100 parts by weight in view of heat setting properties of a sheet which is prepared from the resulting mixture.

In order to use a sheet prepared from a mixture of fluororubber and EVA or EEA as a heat shrinkable tube, it is necessary to provide sufficient shrinkable properties thereto. For this purpose, it is essential to cross-link the polymers.

Such cross-linking can be performed by various techniques such as irradiation with electron beams and cross-linking using organic peroxides or silicones.

The thus-prepared heat-shrinkable tube is superior particularly in heat resistance and oil resistance to those heat-shrinkable tubes prepared from the conventional compositions.

The following example is given to illustrate the invention in greater detail.

EXAMPLE

The polymers shown in Table 1 were each compounded to Fluororubber (sold under the trade name of Viton B by E. I. Dupont) in the proportion of 1:1 and kneaded by the use of heat rolls maintained at 140° C.

Each mixture was formed into a sheet with a heat press and then into a tubular form. It was then cross-linked by irradiation with 20 Mrad electron beam and then expanded to obtain a heat-shrinkable tube.

The above sheet was punched to obtain a dubbell test piece. The test piece was subjected to 100% stretching in an oil bath maintained at 140° C. and then cooled with water. Dimensional changes and heat setting properties were examined, and the results are shown in Table 1.

TABLE 1

| Run No. | Polymer | Blending Properties | Heat Setting Properties[10] |
|---|---|---|---|
| 1 | polyethylene[1] | Very poor | molding impossible |
| 2 | polyolefine[2] | Poor | x |
| 3 | EVA[3] | Fair | O |
| 4 | EVA[4] | Good | O |
| 5 | EVA[5] | Excellent | O |
| 6 | EVA[6] | Excellent | x |
| 7 | EEA[7] | Good | O |
| 8 | EEA[8] | Good | O |

TABLE 1-continued

| Run No. | Polymer | Blending Properties | Heat Setting Properties[10] |
|---|---|---|---|
| 9 | EEA[9] | Good | O |

Note:
[1]Polyethylene . . . Sumikasen C215 (trade name), produced by Sumitomo Chemical Co., Ltd.
[2]Polyolefin . . . Toughmer-A (trade name), produced by Mitsui Petro-Chemical Co., Ltd.
[3]Ethylene-Vinyl Acetate Copolymer . . . Evatate D2011 (trade name; vinyl acetate content; 5%), produced by Sumitomo Chemical Co., Ltd.
[4]Ethylene-Vinyl Acetate Copolymer . . . Evatate H1011 (trade name; vinyl acetate content; 15%), produced by Sumitomo Chemical Co., Ltd.
[5]Ethylene-Vinyl Acetate Copolymer . . . Evatate K2010 (trade name; vinyl acetate content; 25%), produced by Sumitomo Chemical Co., Ltd.
[6]Ethylene-Vinyl Acetate Copolymer . . . Evathrene 450P (trade name; vinyl acetate content; 45%), produced by Dai-Nippon Ink & Chemicals, Inc.
[7]Ethylene-Ethyl Acrylate Copolymer . . . DPDJ-8026 (trade name; ethyl acrylate content; 8%), produced by Nippon Unicar Co., Ltd.
[8]Ethylene-Ethyl Acrylate Copolymer . . . DPDJ-6182 (trade name; ethyl acrylate content; 15%), produced by Nippon Unicar Co., Ltd.
[9]Ethylene-Ethyl Acrylate Copolymer . . . DPDJ-6169 (trade name; ethyl acrylate content; 18%), produced by Nippon Unicar Co., Ltd.
[10]The symbol O indicates that when the test piece is subjected to 100% stretching at 140° C. and cooled with water, the stretched form can be held as such at room temperature, whereas the symbol x indicates that the stretched form cannot be held.

It can be seen from Table 1 that (1) although it is difficult to mix polyethylene and polypropylene with fluororubber, all the EVA and EEA resins can be mixed therewith, and (2) when an EVA or EEA resin having a high vinyl acetate or ethyl acrylate content is mixed with fluororubber, the resulting film has poor heat setting properties.

Heat setting properties were examined for various compositions in which the mixing ratio of fluororubber to EVA or EEA was changed. The results are shown in Table 2. In this test, Evatate H1011 and DPDJ-6169 were used as EVA and EEA, respectively.

TABLE 2

| Run No. | Crystalline Polymer | Ratio of Fluororubber/ Crystalline Polymer | Heat Setting Properties** |
|---|---|---|---|
| 1 | EVA H1011 | 100/0 (0)* | C |
| 2 | EVA H1011 | 95/5 (5.3) | C |
| 3 | EVA H1011 | 90/10 (11.1) | B |
| 4 | EVA H1011 | 80/20 (25) | A |
| 5 | EVA H1011 | 50/50 (100) | A |
| 6 | EVA H1011 | 20/80 (400) | A |
| 7 | EVA H1011 | 0/100 (—) | A |
| 8 | DPDJ-6169 | 100/0 (0)* | C |
| 9 | DPDJ-6169 | 95/5 (5.3) | C |
| 10 | DPDJ-6169 | 90/10 (11.1) | B |
| 11 | DPDJ-6169 | 80/20 (25) | A |
| 12 | DPDJ-6169 | 50/50 (100) | A |
| 13 | DPDJ-6169 | 20/80 (400) | A |
| 14 | DPDJ-6169 | 0/100 (—) | A |

*Values in parentheses are parts by weight of crystalline polymers per 100 parts by weight of fluororubber.
**Heat setting properties were determined by the extent of deformation:
A: 5% or less;
B: 10% or less;
C: more than 10%.

Table 2 above demonstrates that it is suitable for the mixing ratios of EVA and EEA to fluororubber to be at least 10 parts by weight EVA copolymer and EEA copolymer, respectively, to 100 parts by weight of fluororubber.

While the invention has been described in detail and with reference to specific embodiments thereof, it will be apparent to one skilled in the art that various changes and modifications can be made therein without departing from the spirit and scope thereof.

What is claimed is:

1. A heat-shrinkable tube comprising a mixture of 100 parts by weight of fluororubber and 10 to 100 parts by weight of ethylene vinyl acetate copolymer having a vinyl acetate content of 10 to 30% by weight or an ethylene-ethyl acrylate copolymer having an ethyl acrylate content of 8 to 20% by weight, said mixture being expanded into a tubular form after cross-linking.

2. A heat-shrinkable tube as in claim 1, wherein said tube comprises a mixture of 100 parts by weight of fluororubber and 25 to 100 parts by weight of the ethylene vinyl acetate copolymer of the ethylene-ethyl acrylate copolymer.

* * * * *